(12) United States Patent  (10) Patent No.: US 8,307,112 B2
Dearle et al.  (45) Date of Patent: *Nov. 6, 2012

(54) MEDIATED INFORMATION FLOW

(75) Inventors: Alan Dearle, Fife (GB); Richard Connor, Glasgow (GB)

(73) Assignee: Cloudsoft Corporation Limited, Edinburgh (GB)

( * ) Notice: Subject to any disclaimer, the term of this patent is extended or adjusted under 35 U.S.C. 154(b) by 1625 days.

This patent is subject to a terminal disclaimer.

(21) Appl. No.: 10/903,513

(22) Filed: Jul. 30, 2004

(65) Prior Publication Data

US 2005/0060380 A1  Mar. 17, 2005

Related U.S. Application Data (60) Provisional application No. 60/491,776, filed on Jul. 31, 2003.

(51) Int. Cl.
  *G06F 15/173* (2006.01)
  *G06F 15/177* (2006.01)
(52) U.S. Cl. ........................ 709/238; 709/221
(58) Field of Classification Search .................... 709/238
  See application file for complete search history.

(56) References Cited

U.S. PATENT DOCUMENTS

| | | | |
|---|---|---|---|
| 5,769,527 A | 6/1998 | Taylor et al. | |
| 6,128,279 A | 10/2000 | O'Neil et al. | |
| 6,816,493 B2 | 11/2004 | Shi et al. | |
| 6,944,785 B2 | 9/2005 | Gadir et al. | |
| 7,111,074 B2 | 9/2006 | Basturk | |
| 7,167,865 B1* | 1/2007 | Tharp et al. | 707/100 |
| 7,185,077 B1 | 2/2007 | O'Toole et al. | |
| 7,203,743 B2* | 4/2007 | Shah-Heydari | 709/223 |
| 7,213,246 B1* | 5/2007 | van Rietschote et al. | 718/1 |
| 7,251,222 B2 | 7/2007 | Chen et al. | |
| 7,254,109 B2* | 8/2007 | Verma et al. | 370/217 |
| 7,296,191 B2 | 11/2007 | Bae et al. | |
| 7,362,709 B1 | 4/2008 | Hui et al. | |
| 7,380,017 B2 | 5/2008 | Weil et al. | |
| 7,403,980 B2 | 7/2008 | Stringer-Calvert et al. | |
| 7,447,774 B2 | 11/2008 | Viswanath et al. | |
| 7,467,225 B2 | 12/2008 | Anerousis et al. | |
| 2002/0018614 A1 | 2/2002 | Mills et al. | |
| 2002/0046287 A1* | 4/2002 | La Porta et al. | 709/230 |
| 2002/0116397 A1 | 8/2002 | Berg | |
| 2003/0007461 A1* | 1/2003 | Chen et al. | 370/254 |
| 2004/0098447 A1* | 5/2004 | Verbeke et al. | 709/201 |
| 2004/0103193 A1 | 5/2004 | Pandya et al. | |
| 2004/0205250 A1 | 10/2004 | Bain et al. | |
| 2004/0255050 A1* | 12/2004 | Takehiro et al. | 709/252 |
| 2004/0260745 A1 | 12/2004 | Gage et al. | |
| 2004/0267920 A1 | 12/2004 | Hydrie et al. | |
| 2005/0044268 A1 | 2/2005 | Johnston-Watt et al. | |
| 2005/0102405 A1 | 5/2005 | Siegel | |
| 2005/0283525 A1 | 12/2005 | O'Neal et al. | |
| 2008/0016198 A1 | 1/2008 | Johnston-Watt et al. | |

FOREIGN PATENT DOCUMENTS

| | | |
|---|---|---|
| EP | 1035751 A2 | 9/2000 |
| EP | 1043671 A2 | 10/2000 |
| WO | 99/23784 A2 | 5/1999 |
| WO | 2005/013554 A2 | 2/2005 |

* cited by examiner

*Primary Examiner* — Thu Nguyen
*Assistant Examiner* — Joseph Greene
(74) *Attorney, Agent, or Firm* — Sughrue Mion, PLLC (57) ABSTRACT

There is provided a method for mediating the flow of messages in a computer network having a mediation architecture that includes a plurality of logical nodes in a cubic mediation arrangement. The method comprises handing over one or more mediation tasks between a donor mediator module and a recipient mediator module in response to a change request while maintaining system invariants.

5 Claims, 7 Drawing Sheets

Fig.1A.

Logical grouping with
central mediation node

Fig.1B.

Physical manifestation with
heavy bandwidth requirement
on central node

Fig.2A.

Mediation nodes

Fig.2B.

Central network arrangement avoids heavy bandwidth requirement on any one node

Table 1:

| Node | LPP | MR | M | TP |
|---|---|---|---|---|
| Incoming | S addressers implemented by credit balance TP | S addressers implemented via local reference count | S addressers implemented by credit balance MR | S addressers implemented via local reference count |
| Node state | address of MR | routing map; credit balance; reference count | address of TP; mediation state | addresses of LPPs; Interest list; credit balance; reference count |

MEDIATED INFORMATION FLOW

This application claims benefit of Provisional Application No. 60/491,776 filed Jul. 31, 2003; the disclosure of which is incorporated herein by reference.

INTRODUCTION

The present invention relates to a mediated information flow system. In particular, the present invention relates to distributed mediation systems having a requirement both for disseminated, peer-to-peer communication, and for a degree of control of information gathering over the sum of such disseminated messages.

BACKGROUND TO THE INVENTION

Peer-to-peer (P2P) communication systems allow computational entities (peers) to establish software connections (virtual channels) between one another. P2P systems therefore allow peers to communicate or share computational tasks and resources without the explicit need for centralised control. P2P can operate in a generalised network having one or more servers: a peer may provide information (publish) to at least one service on the network and/or register (subscribe) with services on that network to receive information published by another peer.

Messaging systems that benefit from the provision of centralised control are also known. Here, all messages are directed from publishers to subscribers, via a central locus where some computation (mediation) is performed on the messages. New messages (digests, for example) are generated from the input messages and sent to appropriate subscribers.

Figure 1A:
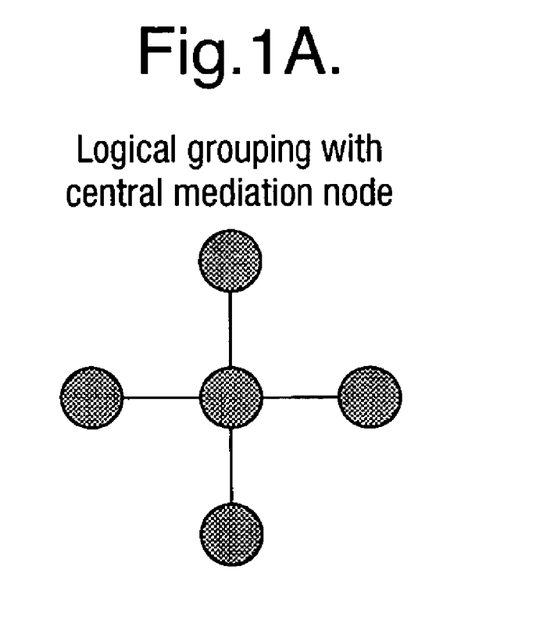
FIG. 1A is a node diagram showing a prior art mediated information flow system with a star-shaped logical architecture.

In prior art centralised mediation systems, all message traffic is transmitted through a central network point (locus), where the mediation service resides. Viewed in terms of logical elements, such systems are constructed as a star-shaped architectural model with a central point of control, where mediation tasks are executed. This model is shown in FIG. 1A: each source (publisher) and sink (subscriber) of information has a line of communication that connects to the central mediation hub. In many cases, the sources and sinks represent the same entities operating in different modes, and may not be architecturally distinguishable.

The problems associated with such an architecture are well known. They are prone to suffer from a lack of bandwidth at the point of mediation. Even though the logical star shape may be superimposed upon a physical network that is highly connected, the essential flow of all information through a central point causes an inherent throughput bottleneck, based upon the bandwidth available between this point and the network (see FIG. 1B). Although advances in networking technologies mean that bandwidth availability continues to improve, increasing bandwidth has an inherent financial cost, and in certain scenarios can cause a real limitation to the throughput of the overall system. This limitation is manifested as a restriction on either the maximum number of users, or the rate at which each user is able to send and receive information.

Indeed there are many examples of systems where neither P2P architectures nor centralised mediation architectures are wholly satisfactory. Often some logical process is required to act over the sum of messages broadcast within the messaging system. Examples of classes of systems where neither architecture is completely suitable include: a trading system where potential buyers and sellers advertise to each other, mediation is required to ensure a transactional matching of requirements; a mediated news or publishing system where a central authority acts as the editorial control, before information is disseminated; a system which is not actively controlled but which requires an ordered log of information flow to be maintained in a central repository; a conversation service which allows a recent context to be presented to a user joining an ongoing conversation; distributing cryptographic keys (the so-called key distribution problem); systems for finding the location of data (state) and services on a distributed network; and systems for locating and communicating with mobile users.

All the examples above have in common a requirement both for peer-to-peer communication, and for a degree of centralised mediation of the flow of information when the communication is viewed as a whole.

It is therefore an object of the invention to obviate or at least mitigate the aforementioned problems.

SUMMARY OF THE INVENTION

In accordance with one aspect of the present invention there is provided a method for mediating the flow of messages in a computer network, wherein the computer network has a cubic mediation network that includes:
  two local point of presence (LPP) modules for interfacing between the mediation network and client programs;
  two mediator (M) modules for hosting mediation tasks;
  two mediator router (MR) modules for analyzing the content of incoming messages, each MR module routing the incoming messages to a predetermined M module in dependence upon said content; and
  two transmission proxy (TP) modules for forwarding messages to at least one of said LPP modules,
  wherein, in the method, incoming messages to the mediation network are propagated along a mediation cycle that comprises the steps of:
  an LPP module, addressing incoming messages to a respective one of said at least one mediator router (MR) modules;
  in said addressed MR module, analyzing the content of incoming messages and routing said messages to a predetermined mediator module in dependence upon said analyzed content;
  in said predetermined mediator module, applying the mediation task to said analyzed messages and directing mediated messages to a respective one of said TP modules; and
  in said TP module that receives said mediated messages, forwarding said mediated messages to at least one of said LPP modules.

Distributed mediation therefore forms a hybrid between the P2P architecture and the centralised mediation. The logical central hub of the star-shaped architecture is replaced by a central, but distributed, mediation network of mediator nodes that has multiple connections to the outer network of sources and sinks. This approach addresses the bandwidth restrictions of the star-shaped (centrally mediated) architecture. The mediation requirement of the system is distributed among the nodes of the distributed mediation network according to some classification imposed over the set of messages it carries. The set of all incoming messages is separated out into a number of non-overlapping subsets according to the message content. This concept of classification does not affect the outwardly observable behaviour of the system's operation, but only its overall throughput.

The physical arrangement of the distributed mediation network is very different from the centrally mediated network: in the former case, there are many network connections to absorb the same amount of information flow, resulting in proportionally lower bandwidth requirements at each node. Whereas the logical picture can be represented as a number of mediator nodes placed within a single network, it will be understood that, in reality, the physical node sites may be physically, even geographically, dispersed among a plurality of client machines. This is particularly likely to happen when the architecture is deployed at sites around the world, when there is unlikely to be any close relationship between the logical and geographical placement of mediation servers.

Clearly, the advantages of this approach stem from the physical organisation of networked machines. Each mediator node is capable of autonomous functionality, being able to perform its action without reference to any other node. Given a highly connected network infrastructure, the maximum required bandwidth, to achieve a given throughput, is reduced to an arbitrarily low value. Given that the mediation load can be evenly divided among the machines employed by the mediation service, this can be achieved by scaling up the number of mediator nodes on the network. The maximum required bandwidth at any one point within the network is still proportional to the network load, but is also inversely proportional to the number of mediator nodes deployed. Naturally, any extra network load caused by organising the splitting of the whole mediation requirement onto a number of platforms must be low enough to avoid negating the benefits of the architecture.

In addition to carrying client messages, the distributed mediation network facilitates the dissemination of control or management messages. Management messages differ in that they are concerned only with the propagation of instructions to successive nodes in each cycle within the network, in particular to effect changes in internal operation. They may be interleaved with client messages.

By addressing changes in internal operation, the present invention seeks to allow both dynamic load balancing to take place within a fixed topology network, and process migration in association with arbitrary changes in logical topology, without introducing instability in either case.

The two mediator modules may comprise a donor mediator module and a recipient mediator module, such that the method may further comprise: inducing a handover of a mediation task from the donor mediator module to the recipient mediator module by directing a control message as an incoming message along the mediation cycle.

As users' demands vary with time over the classification, the handover operation provides functionality that allows the nodes at which mediation tasks are executed to be moved physically to balance both network and computational loads for the whole system.

Preferably, the control message is a mediator handover message, the content of the mediator handover message describing the reallocation of content having a predetermined content tag from the donor mediator module to the recipient mediator module, where the donor mediator module is currently registered as handling said content, and the direction of the mediator handover message may comprise:
 from a predetermined LPP module, sending the mediator handover message to a respective associated MR module;
 at the associated MR module, reading said content tag and forwarding the message to the donor mediator module; and upon receipt of the mediator handover message, the donor mediator module: changing mediator node state; sending a MEDIATOR_HANDOVER message to the recipient mediator module, the MEDIATOR_HANDOVER message containing the content of the mediator handover message; sending a MEDIATOR_CHANGED message to an associated TP module; and then changing state in order to forward messages containing the content tag to the recipient mediator module.

The method advantageously further comprises:
 the TP module forwarding the MEDIATOR_CHANGED message to at least one LPP module;
 the recipient mediator module generating a NEW_MEDIATOR_ACTIVE message, the NEW_MEDIATOR_ACTIVE message having a payload corresponding to the reallocated content, and broadcasting said NEW_MEDIATOR_ACTIVE message to all TP modules associated therewith; and
 the LPP module buffering all incoming messages between receipt of the MEDIATOR_CHANGED message and receipt of the NEW_MEDIATOR_ACTIVE message.

The method may then further comprise:
 the LPP module then forwarding the NEW_MEDIATOR_ACTIVE message to the associated MR module; and
 whenever a MR module receives a NEW_MEDIATOR_ACTIVE message, updating a routing table for said MR module to cause future content matching the payload of the NEW_MEDIATOR_ACTIVE message to be sent to the recipient mediator module rather than the donor mediator module; informing the donor mediator module that the routing table has been updated, the donor mediator module thereafter ceasing to forward messages once all MR modules have been informed that the recipient mediator module is now the mediator module for the reallocated content.

BRIEF DESCRIPTION OF THE DRAWINGS

Examples of the present invention will now be described in detail with reference to the accompanying drawings, in which.

DETAILED DESCRIPTION

The P2P and centrally mediated messaging models that provide the background to the present invention are first explained. Throughout this discussion, the term source designates a client that generates new messages to send into a network service and the term sink designates a client that receives messages from a network service. Each client of a network service may be a source, a sink, or both. In an alternative terminology, sources of information are referred to as publishers and sinks for information are referred to as subscribers.

In peer-to-peer content-based routing, a network is configured to allow the efficient transmission of messages from source to sink, based upon the establishment of virtual channels between the appropriate sources and sinks. Efficiency is typically achieved by the detection and removal of unnecessary edges (lines of communication connecting nodes) from a fully connected graph, with the resulting optimised graph then tailored to available network infrastructure. To establish a P2P virtual channel requires an expression of interest from one peer and an acceptance of that interest by the other peer.

Figure 1B:
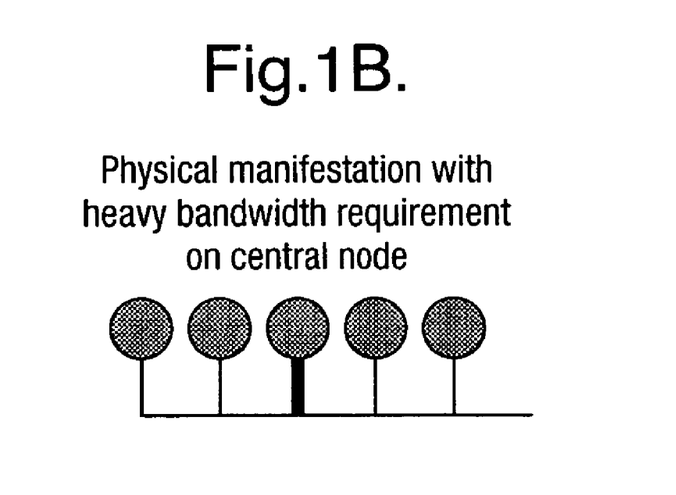
FIG. 1B is a schematic node diagram showing the physical architecture of the system in FIG. 1A.

On the other hand, in centrally mediated models, all messages are transmitted via a central mediation node (see FIGS. 1A and 1B). In the parlance of mediation networks, a mediation service is the general term applied to some computation that is applied to all incoming messages; the mediation requirement for any particular instance of a mediated architecture refers to the collation of all mediation services provided therein; a mediation authority is a person or persons providing such a mediation service; a mediation network is the network of physical computational entities (machines) under the control of the mediation authority; and a mediation server, the physical machine hosting one or more mediation services.

In a simplified model of a generalised mediated information flow system, messages sent to the mediation authority may belong to one of the following types: new information, emanating from a process acting as an information source; queries about state held by the mediation authority, requesting an immediate reply; and expressions of interest, essentially persistent queries requiring ongoing replies whenever pertinent new information is received by the mediation authority.

It is worth remarking that even in a fully mediated model, expressions of interest may still be significant, especially in the delivery of this network service to sinks, where they can reduce the bandwidth requirement on each virtual channel.

In the light of the above definitions, a mediated information flow system is one that consists of messages, containing information, being sent to and from a central authority. Actions taken by this authority may include time-ordered logging of received messages, computation over the sum of messages received up to a point, and dissemination of incoming messages among other clients, possibly after performing some processing based on the message content.

Figure 2A:
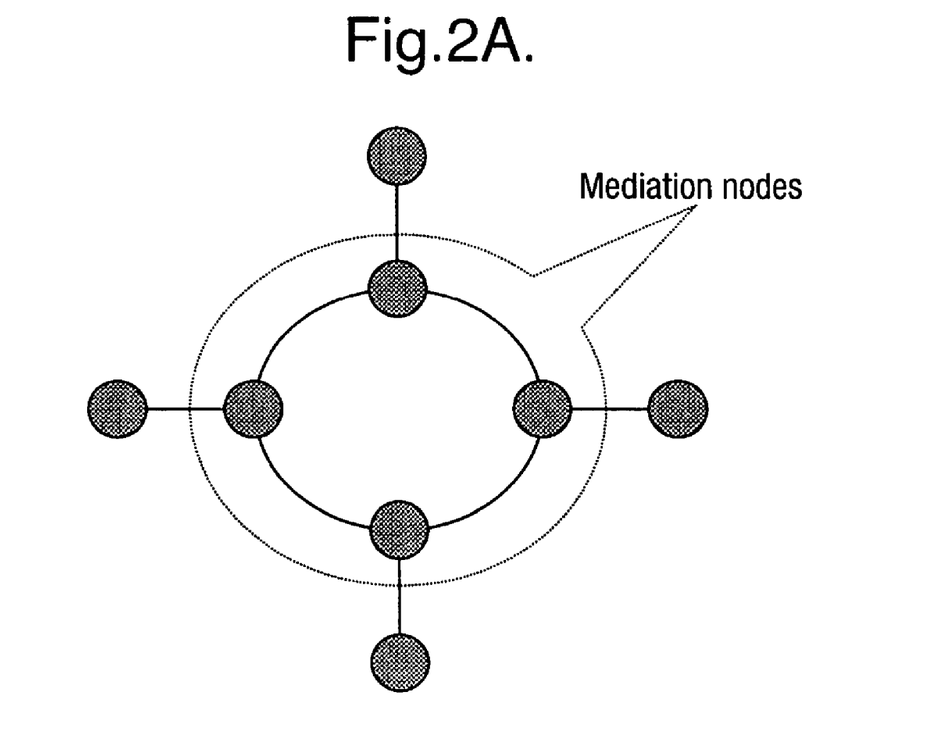
FIG. 2A is a node diagram showing a prior art mediated information flow system with a central network logical architecture.
Figure 2B:
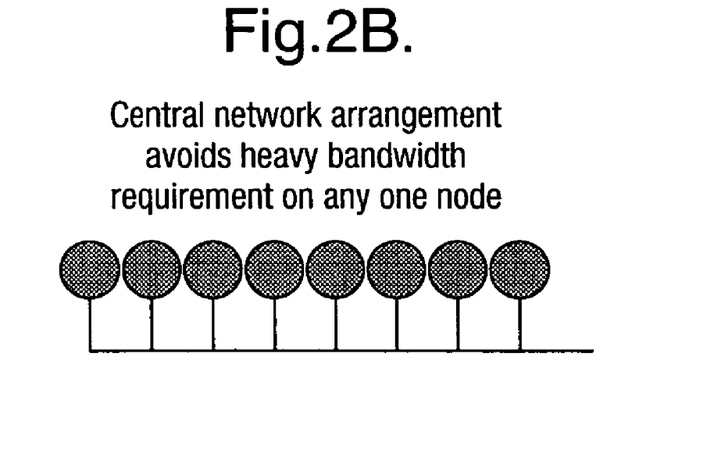
FIG. 2B is a schematic node diagram showing the physical architecture of the system in FIG. 2A.

The present invention represents a hybrid of the content-based, decentralised P2P model and the simple, centrally-mediated network model. Rather than provide a single, central mediator, the various mediation services are dispersed across a mediation network comprising a number of separate functional components. In the hybrid model, expressions of intent are used to open virtual channels between source nodes and mediator nodes, and expressions of interest are used to open virtual channels between the mediator nodes and sink nodes. Messages received by sink nodes are therefore governed by expressions of interest registered with the mediated service. The latency between source and sink nodes is necessarily greater than in simple content-based routing, as there are two or more logical hops involved. Provided the context allows it, the latency in each logical hop can be successively reduced as more static information becomes available. Relative to the simple mediated model, the mediation task is more complex, because it is spread over multiple nodes (see FIG. 2A). However, the inherent central bottleneck of the centrally mediated model has been removed and the resulting architecture is scalable.

The set of all incoming messages is separated out (classified) into a number of non-overlapping subsets (categories) according to the message content. The entire mediation requirement is implemented as a number of mediation tasks, each task separately served in a different process operating over a respective category of incoming message. Each message includes content that indicates whether that message is a member of a particular category or not, the so-called deterministic predicate. This deterministic predicate may be considered to be the "verbal" part of a "sentence" of the message. Incoming messages are therefore classifiable according to deterministic predicates that their content. A category can then be seen as a subset of all possible messages based on an associated deterministic predicate. Indeed, the presence of a given deterministic predicate characterises the corresponding category.

In a mediated news or publishing service where a central authority acts as an editorial control, before information is further disseminated, examples of the deterministic predicate include:
EQUALITY on a unique identifier of document
    e.g. doc_id=1246512331400
    e.g. newsML itemid="238563"
some date/time expression
    e.g. newsML newsitem.date<28 Jul. 2003 and newsitem.date>10 Jan. 2001
EQUALITY on Country code of document
    e.g country_code=UK or
    country_code="UK" or country_code="US"
    {using newsML country_code}
some topic code associated with what the article is about
    e.g. Topic="human rights" {using a newsML topic code}
some predicate based on the attribute values of a newsML article:
    e.g. <dateline>=="LONDON"
In a transactional trading service where a central authority acts to match the requirements of buyers and sellers. Examples of deterministic predicates include:
Article="piano" and location="NE Scotland" and price<£3
Stock="IBM"
Category="Home>All Categories>Sports" and item="windsurfer"
In a conversation service that allows a recent context to be presented to a user joining an ongoing conversation, the deterministic predicate might be:
Topic="sailing" and category="Topper"
Topic="Mail servers" and category="sendMail" and operarting system="Unix" and in an example taken from newsgroups
Topic=alt.money.currency.us-dollars
In a the case of Distributing cryptographic keys (the so-called key distribution problem), the deterministic predicate might be based on key value, for example:
Key value>23352345 and keyvalue<66676767979079
In the case of finding the location of data (state) and services on a distributed network, the deterministic predicate may be based on a globally unique identifier (GUID):
    e.g. GUID=125645654645
or it might be based on a descriptor of the service we are looking for:

e.g. Service="printer(type="laserjet"; price="4p/page"; size=AO)"

Finally, in the case of locating and communicating with mobile users, examples of deterministic predicates include
Name="Bon Monkeyhouse"
phone number="01776 32463274327"
e-mail address=asau@ghsghdsg.net The set of all categories (and therefore the set of all messages once classified) is referred to as a classification. Classification, therefore, represents a partition of the set of all messages, and a single message may not belong to more than one category. This concept of classification does not affect the outwardly observable behaviour of the system's operation, but only its overall throughput.

The classification of the system is independent of the type of message being sent (new information, expression of interest, or query), since it is based upon some characterisation of the information passed around within the system. Crucially, the classification may occur through an automated process. Such incoming messages may consist of information about, or queries pertaining to, that category within the classification.

The classification of the information system is performed by the mediation authority, and this may occur during the operation of the system. A deterministic predicate must be generated to allow the testing of arbitrary messages for inclusion in the category. For each category thus identified, a separate process is created within the mediation network to handle its mediation service. Finally, it is worth noting that the classification is used only to enhance the performance of the logical system, rather than to change its semantics in any way, and clients of the system will be unaware that it exists.

The mediation task for each category is hosted upon a particular machine (computer) within the mediation network. When the system is operational, messages are sent by clients into the mediation network. Messages received into the network are forwarded to the appropriate mediation service, according to an analysis of their content via the set of all category predicates. This forwarding process requires knowledge of the classification, and the physical location where each mediation task is hosted, to be passed around the mediation network.

Figure 3:
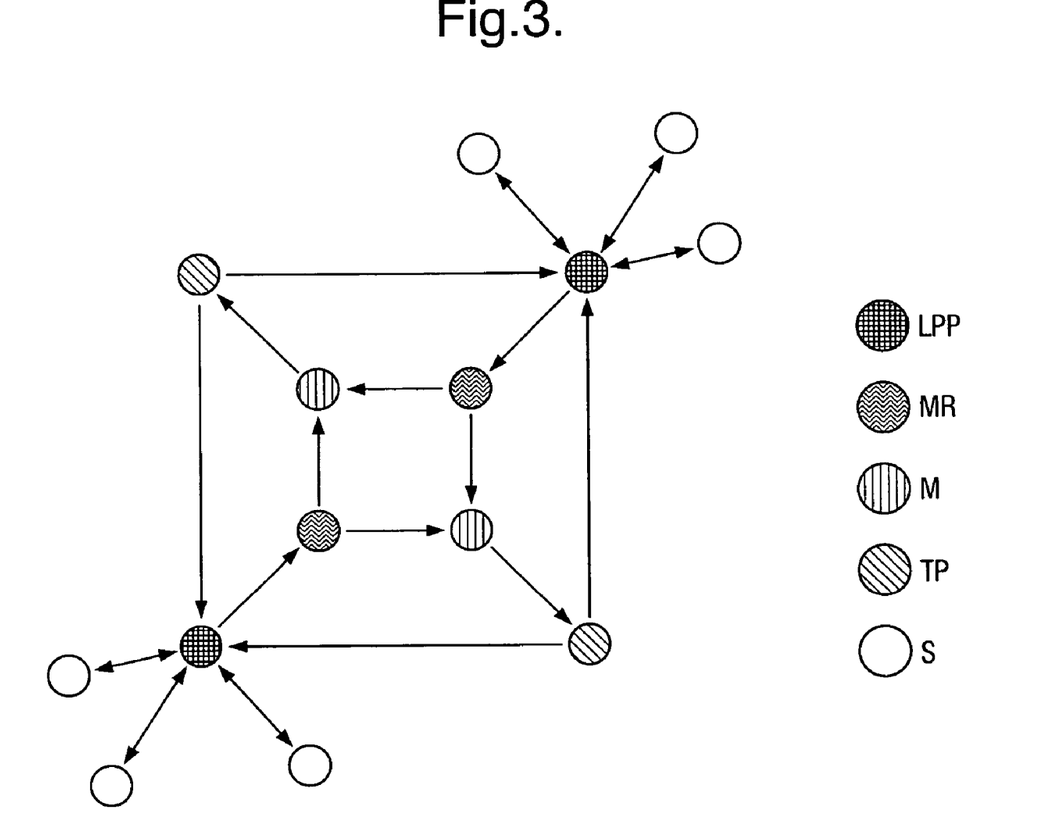
FIG. 3 is a schematic node diagram showing a "cubic" distributed mediation model in accordance with the present invention, including the fundamental cycle (LPP→MR→M→TP→LPP) of which every effective distributed mediation network node is a part.

FIG. 3 shows a topology that illustrates the functional components of a (hybrid) distributed mediation model that is in a "quiescent" or "steady state", i.e. a state in which there is no provision for changes in the logical topology. The Figure shows how data flows around the system among the various component nodes.

All the component nodes necessary for a distributed mediation model of unlimited scale are present in this minimal topology, including: sources, sinks, local points of presence, mediator routers, mediators and transmission proxies. Throughout the following discussion, these terms and others listed below take a definition as set out below:

Local Point of Presence (LPP): a local point of presence acts as an intermediary between clients (sources and sinks) and the rest of the distributed mediation model. Local points of presence are network nodes that provide proxies for a mediated service for a particular geographical region. Each source or sink will thus communicate with only a single local point of presence, and with no other nodes within the mediation architecture. There may be an arbitrary number of LPPs in a system, each serving a respective number of clients.

Mediator (M): a mediator is a network node incorporating a mediator module, which services the mediation requirement. Each mediator has an associated downstream distribution, which is used to pass relevant messages to LPPs, and therefore, ultimately, to the sinks. Each mediator module implements one or more mediation task, each task acting upon a single category of incoming message. Mediator modules may be configured to log all incoming messages they receive and to forward these messages to the associated downstream transmission network. Mediation tasks may then include servicing queries over message logs thus generated.

Mediator Router (MR): a mediator router is a network node, incorporating a mediator router module, that analyses the content of incoming messages, determines which category the messages belong to and routes them to an appropriate mediator. Each mediator router sits at the head of an upstream network and receives messages from a number of LPPs. A mediator router may also log incoming messages to allow, for example, a local service within the geographical area it serves.

Transmission Proxy (TP): a transmission proxy is a network node, incorporating a transmission proxy module, that analyses messages output by one or more mediator nodes; determines, from registered expressions of interest, to which sink(s) the outgoing message is directed; and forwards messages on the downstream network associated with each mediator.

The upstream network (from source to mediator router) is seen to be mediated but not content-based. Routing between mediator routers and mediators, in the so-called cross-stream, is content-based. The downstream network, too, requires content-based routing: indeed message routing between mediator routers and LPPs can be regarded as a hybrid content-based delivery mechanism in its own right. The partitioning of the message space as a part of this hybrid allows the introduction of a mid-stream mediation service to the publish and subscribe model without introducing a non-scalable central bottleneck.

For a "quiescent" or "steady state" system, the following statements relating to the distributed mediation network are always true. These statements may be considered "global invariants" of the distributed mediation architecture.

Every node is part of a cycle LPP→MR→M→TP→LPP
Every LPP addresses a single MR
Every MR may address any arbitrary M
Every M addresses a single TP
Every TP may address any arbitrary LPP The symbol "→" used above represents a unidirectional connection (a directed edge).

Figure 5:
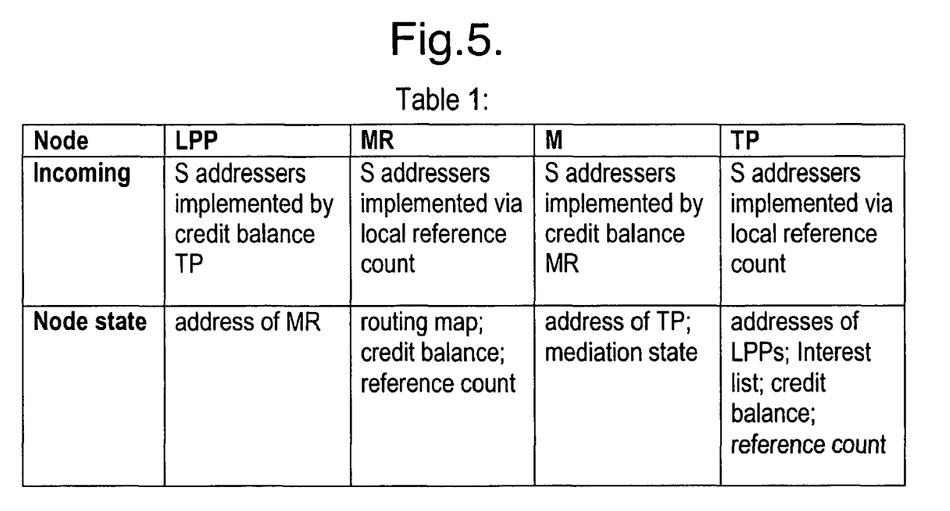
FIG. 5 shows a table (Table 1) of dependencies in the distributed mediation network of the present invention.

Table 1 (FIG. 5) lists the dependencies for "correctness" of mediation change algorithm: i.e. the total extramural knowledge required to be maintained by each node.

From inspection of the "global invariants" above, it is clear that the network illustrated in FIG. 3 includes nodes of each type (LPP, MR, M and TP), configured in a simple cycle, with unidirectional connections arranged therebetween: LPP→MR→M→TP→LPP. In fact, two of each type of node are present in a configuration known hereafter as a "cubic" network. The cubic network illustrates properties of general distributed mediation networks.

The message flow between connected nodes is unidirectional. Every node in the cubic network is a component of at least one cycle, LPP→MR→M→TP→LPP. The cubic network exhibits a "fan in/fan out" topology: while every LPP sends each message to precisely one MR, each MR may be addressed by a plurality of LPPs (two in FIG. 3)—fan-in; every MR is capable of sending a message to any mediator—fan-out; every mediator sends any given message to precisely one TP, while each TP may be addressed by a plurality of mediators—fan-in; and finally, every TP is capable of sending a message to any LPP—fan-out.

Distributed mediation networks such as the minimal cyclic and the cubic networks also display another important property: a directed path exists from every node to every other node in the network. In graph theoretical terms, every node is in the transitive closure of every other node. This property holds trivially for cyclic networks: it does however hold in more complex distributed mediation networks, as consequence of the global invariant properties. The directed path can always be considered as a directed cyclic graph. Thus for any two nodes A and B within a generalised distributed mediation network, a cycle exists from A to A which contains B. It is worth noting that in a cubic (single-level) network the maximum path length of such a cycle is 8, rather than 4.

Again, each node has no global dependency or any detailed knowledge of the network beyond its immediate neighbours. Each node stores identities only of those nodes it directly addresses. Nodes also store information about the totality of nodes which address each node within the network; this may be stored either as a reference count in the node itself, or as a credit balance value in all nodes that directly address it. In either case the identities of the addressing nodes need not be stored. Indeed, no node need store any further information about the rest of the global system.

A further important property of the distributed mediation network of the present invention it that behaviour is deterministic and ordered within each node; that is, it is possible to ensure that a message B arriving after a message A is also dispatched after message A. Likewise, messages can not overtake on direct links between nodes; thus, for any two nodes N1 and N2 such that N2 is directly addressed by N1, then if a message A is sent to N2 by N1, and subsequently a message B is sent to N2 from N1, then N2 will receive message A before receiving message B.

Causal Barrier

Each node in the generalised distributed mediation network has detailed knowledge of the existence only of other nodes to which it directly sends messages. Information about nodes from which it receives messages is stored in a form representing only the totality of such nodes. As has been mentioned previously, this information may be stored either as a reference count in the node itself, or as a credit balance value in all nodes that directly address it.

In certain cases, some degree of global control is required to effect change within the network while maintaining ordered, deterministic behaviour. This is where information about the totality of nodes which address each node within the network becomes useful. The distributed mediation network requires a further property whereby a set of coherent changes can be made apparently atomically with respect to any message passing within the system at the time the change is made: a property referred to as a causal barrier algorithm.

Where the addresser information is stored as a reference count, the causal barrier algorithm is a totality of receipt algorithm. In cases where one copy of a given message is expected at a target node from every node that directly addresses the target node, it is possible to establish that this has indeed happened as follows: the target node maintains a reference count, which corresponds to the number of nodes that directly address it; whenever a message is sent, information is added to include the unique identity of the sending node; if the receiver requires to detect whether copies of the same message are sent by all sending nodes, then the sending node identifier information is retained locally in association with a corresponding message ID; and when the number of such unique messages received is equal to the reference count, then the message is known to have been received from all nodes that directly address it.

For nodes that do not contain a reference count, a different causal barrier algorithm may be used. This algorithm relies on the presence of a credit balance field in each node that directly addresses the receiving node. Whenever a message is sent, information is added to include the unique identity of the sending node and the value of the credit balance field. If the receiver requires to detect whether copies of the same message are sent by all nodes, then the sending node identifier information ID is retained locally in association with the message ID. Furthermore, a credit balance accumulator is maintained, which is set to contain the total of all credit balance values contained in such messages. The message is known to have been received from all sending nodes when the credit balance accumulator becomes equal to a predetermined total value, say, 1.0.

Both reference counting and credit balancing techniques, therefore, ensure that the causal barrier algorithm can confirm that all messages have been received by the appropriate modules, thereby establishing the termination of the causal barrier algorithm for any particular change in the internal topology of the mediation network. The application of such "book-keeping techniques" allows mediator modules to detect when a mediation change is complete without requiring static knowledge of the number of MR modules sending information to them.

Evenly dividing mediation load over physical machines is not generally responsive to changes in load conditions. To be responsive, the partition of the information space (distribution of mediation load according to classification) must be load-balanced. In other words, the bandwidth requirements at any single point in a physical network must remain proportional to the network load as a whole. As the logical focus of messages changes over time, this will require dynamic adjustment based upon a predictive model, itself based on the recent history of the information flow. The extra network load incurred simply by having to organise the splitting of the mediation service across more than one platform must also be allowed for in any load-balancing model.

The mediation requirement of the system is dispersed among the nodes of the distributed mediation network according to the classification imposed over that system. It has, however, been observed that full knowledge of all locations and all predicates is not required by all network nodes (machines). The only requirement for correct operation is that every message eventually arrives at a mediator hosting a mediation task appropriate to the category to which the message belongs.

Mediation services may therefore be moved dynamically, within the mediation network, while the system is operational. This in turn allows the adjustment of the system load within the mediation network, according to dynamically shifting patterns of interest among the system clients. Such patterns of interest may be assessed according to predefined knowledge about the clients, by way of the expressions of interest made by them, or according to analysis of changing use patterns within the system.

Load-Balancing—Handover

The distributed mediation architecture of the present invention is based on an arbitrary topology of nodes: LPP, MR, M and TP. This topology of nodes has the properties described above in relation to the "steady state". This same topology is eminently suitable for the dynamic balancing of loads amongst existing functional components.

Whenever a particular category is deemed to be under heavy load, the hosting of the associated mediation task may be moved to a machine within the network that has spare capacity. The handover of the mediation task also requires dynamic adjustment of the mediation network to ensure that any messages, either currently within the network, or to be received in the future, are diverted to the new mediator node. This may be achieved by the propagation of special messages around the new logical network topology, i.e. a "causal rippling" through the appropriate machines. Mediation change can thereby occur within a live system without affecting the observable behaviour of that system in terms of message input and output.

Mediation change is ultimately possible by virtue of the global invariant property whereby an incoming message will be routed to the same mediator regardless of the LPP from which it emanates. Mediation change poses the problem of changing from one consistent state to another, within a live system, and without adversely affecting the system's correctness or performance. Two main functions of the distributed mediation network must be considered: message propagation and querying, and in particular start-up queries.

To answer queries, it is necessary to know which classification is being applied at any particular time. This allows the discovery of which mediator hosts any given category of message at any given time. However, to do this deterministically for any class of query would require some degree of global synchronisation. As an alternative to global synchronisation, the distributed mediation model is arranged to permit certain classes of query to be answered without perfect global information or synchronisation.

Consider the progression of states from a time in which the system is in a first consistent state PS1 to a new consistent state PS2. At time $t_0$, the process of changing to the new state PS2 commences. At some unknown time after this, $t_1$, the system is known to have changed to the new consistent state PS2. The time $t_b$ when the actual change occurs is unknown but bounded by $t_0$ and $t_1$.

Between time $t_0$ and $t_1$ we define the system as being unstable, meaning that the currently operative apportionment of mediation tasks is not known globally. Each of the system functions however is unaffected, as at each point sufficient local knowledge is available to correctly handle the information flow.

An appropriate algorithm for permitting the underlying partition (classification), as manifested by the apportionment of mediation tasks, to be changed in a running system, is now described. It should be noted that the algorithm is capable of handling the addition or removal of mediator nodes, a functionality discussed in more detail later.

Using, for the sake of clarity, a simplified model in which each message carries a content drawn from a finite set of symbols. The partition (classification) is characterised by a mapping from content tags to a finite set of classes (categories). The classes are named according to their allocated mediator. Changes to the partition are characterised by specifying the reallocation of a content tag to a different mediator.

Also for the sake of descriptive simplicity, it is assumed that: changes only involve two mediators; and one change completes before another begins. Neither of these assumptions is an absolute requirement, but have been made to simplify the model; nonetheless the simplified model is general and allows arbitrary change to be made to the system.

Figure 4A:
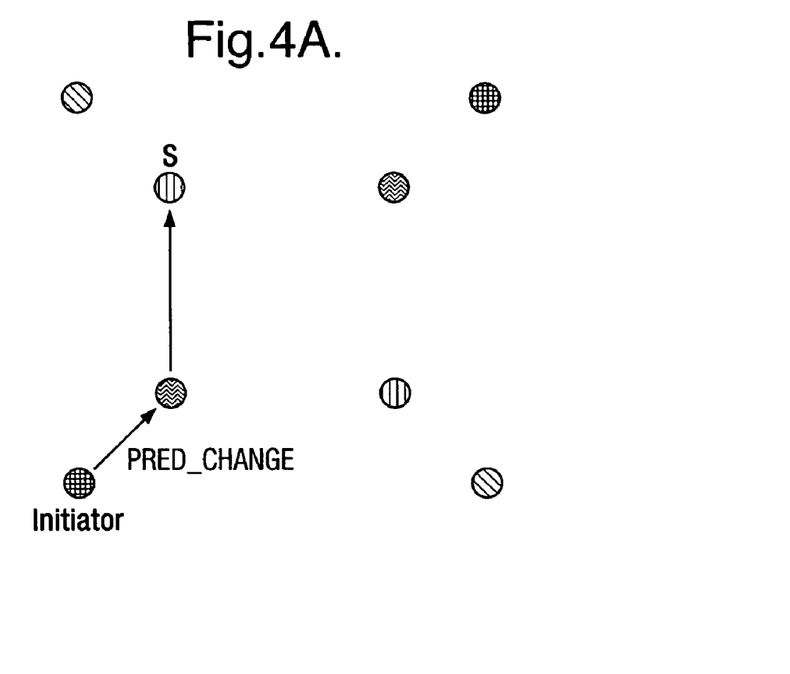
FIGS. 4A to 4F shows the steps of handing a mediation task over from a sending mediator S to a recipient mediator R in the "cubic" distributed mediation architecture.

The process begins with a PRED_CHANGE message being sent by some (initiator) LPP to its mediator router (see FIG. 4A). The content of a PRED_CHANGE message describes the reallocation of a content tag to a different, recipient mediator, R. The MR reads this content tag and forwards the message to the mediator, S, currently handling that content.

Figure 4B:
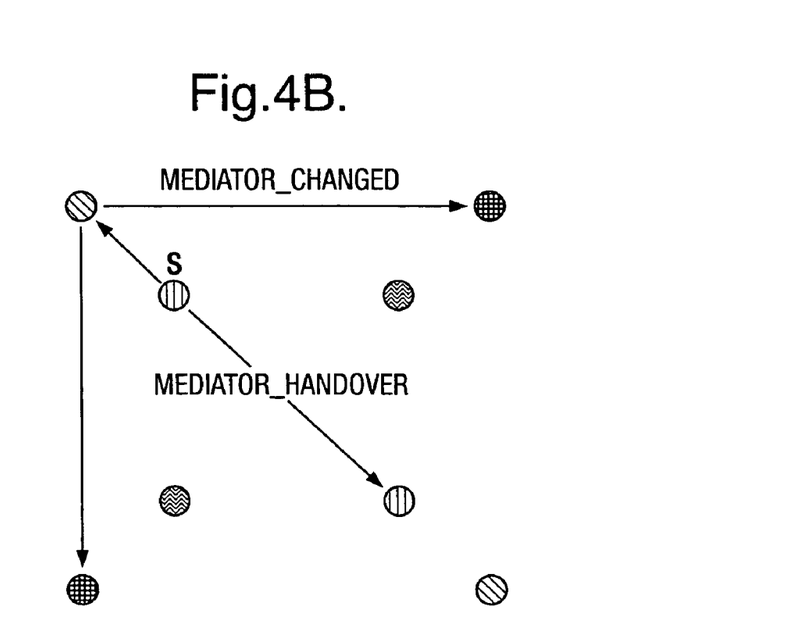
Figure 4C:
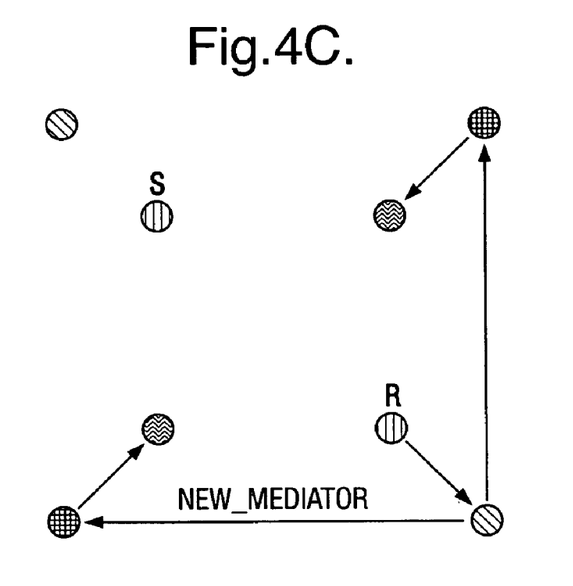

Upon receipt of a PRED_CHANGE message (as shown in FIG. 4B), the mediator:

Changes its state from STABLE to HANDOVER_SENDER.

Sends the handover recipient mediator, R, a MEDIATOR_HANDOVER message containing the content of the PRED_CHANGE message.

Changes its internal state to forward messages containing the content tag to the handover recipient mediator, R, for this change.

From this point onwards any messages sent by any mediator router to the mediator, S, concerning the topic undergoing mediation change will be forwarded to the mediator, R. The purpose of the MEDIATOR_CHANGED message sent to all the mediator's LPPs via the TPs is to ensure causal delivery of messages sent on the downstream network.

When a LPP receives a MEDIATOR_CHANGED message it places itself in the BUFFERING state. When in this state, the LPP buffers all DOWNSTREAM_DATA messages until it receives a NEW_MEDIATOR message for the corresponding content. This is enough to ensure causal ordering of messages forwarded to mediator R and prevent older messages mediated by mediator S from being processed by the LPP out of order.

As shown in FIG. 4, upon receipt of a MEDIATOR_HANDOVER message, a mediator changes its state from STABLE to HANDOVER_RECEIVER denoted by the R label on the mediator node. In this state, a mediator expects forwarded messages whose content match that of the MEDIATOR_HANDOVER message. From the point that the MEDIATOR_HANDOVER message is received, the mediator is mediating that content although the rest of the system may not be aware of this. In order to notify the architecture of a mediation change, the new mediator sends a NEW_MEDIATOR message to all of its TPs. This is a broadcast of mediation change and is forwarded by the TPs to all LPPs and by all LPPs to all MRs as shown in FIG. 4C.

Figure 4D:
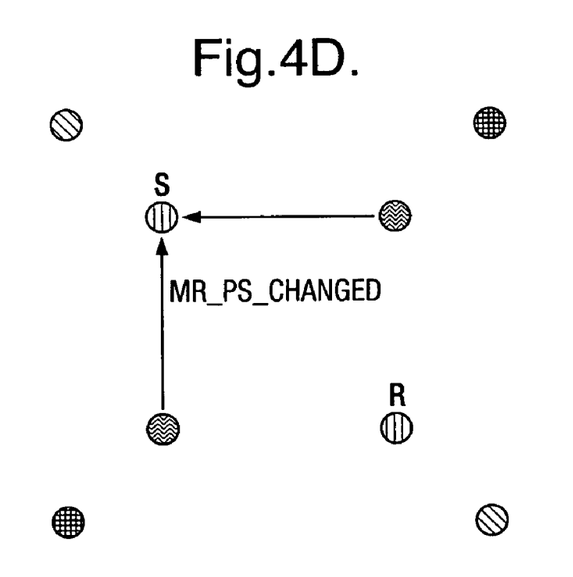
Figure 4E:
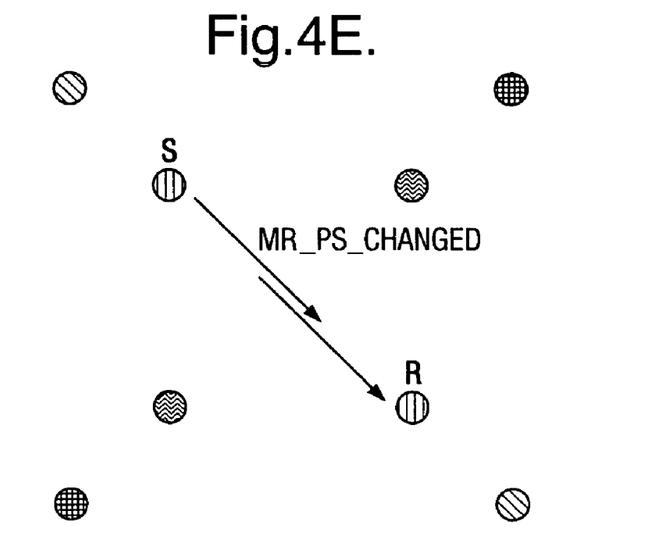

As shown in FIG. 4D, when a MR receives a NEW_MEDIATOR message, it updates its routing table to cause future content matching the payload of the NEW_MEDIATOR message to be sent to the mediator R rather than mediator S. At this point a change in content-based routing has been achieved. However, mediator S must be informed of this event so that it can cease forwarding messages once all MRs are aware of that mediator R is now the mediator of the content. Similarly, mediator R needs informed of these events so that it can return to stable operation and stop expecting forwarded messages. Consequently, after changing its routing table, a MR sends a PE_PS_CHANGED message to the old mediator of the content (S), which it extracts from the routing table before updating it. As shown in FIG. 4E, mediators in the HANDOVER_SENDER state forward all PE_PS_CHANGED messages to the new recipient mediator.

Figure 4F:
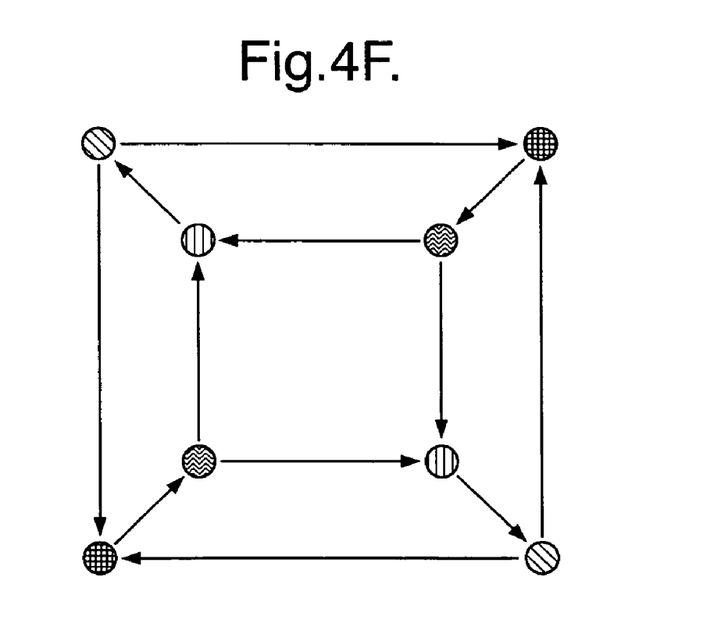

The handover algorithm may use the causal barrier method for maintaining causal ordering with a reference count technique to establish that the messages have propagated around the mediation network correctly. Mediators in the HANDOVER_SENDER and HANDOVER_RECEIVER states count the PE_PS_CHANGED messages received from MRs, which allows them to determine when all the MRs in the system have received the change of mediator information. When they receive the last PE_PS_CHANGED message they change their state from HANDOVER_SENDER and HANDOVER_RECEIVER respectively to STABLE as shown in FIG. 5F.

As can be seen in the description above, the mediator's behaviour is characterised by a finite state machine which may be in one of the following three states.

STABLE—The normal, running state of the mediator; no change is currently undergoing within the predicate set which will result in its handling a greater or lesser equivalence class within the data space.

HANDOVER_RECEIVER—The mediator is in an unstable state, and the size of its equivalence class has just increased due to the reallocation of part of the message space (the delta) from another mediator (the HANDOVER_SENDER). While in this state, it may receive forwarded messages from the mediator formerly responsible for the delta, which it passes on to its transmission proxy as if they had been sent directly to it. It may also receive data messages within the delta directly from any predicate evaluator which has become aware of its new role; any such message must be buffered until it is known that no more forwarded messages from the same source may be forthcoming (via a PE_P-S_CHANGED message).

HANDOVER_SENDER—The mediator is in an unstable state, having passed a delta from its former equivalence class to another mediator. Any messages received within the delta must be forwarded to the corresponding HANDOVER_RECEIVER.

Implementation

The distributed mediation network of the present invention may be implemented either as computer implemented software or hardware. As software, the implementation may be stored on volatile and/or non-volatile memory means. Computer program products, for example CD-ROMs, DVD-ROMs or data constructs retrieved from internet servers, may incorporate software representations of the network in accordance with the present invention.

In operation, the computer programs may be stored on nodes where the components for a particular function of the distributed mediation network may operate. Alternatively, they may be stored on a central repository that can be referenced from the nodes on which the component(s) for a particular function of the distributed mediation network may operate. The first step in setting up a distributed mediation network is to install the software and configure a basic network. For verification of the installation, a predefined cubic configuration may be provided. This configuration would run on one physical node and scripts would be provided to verify the correct operation of the distributed mediation network. Once the initial verification has been performed satisfactorily, the administrator of the system would deploy mediation programs for specific applications written by a programmer, for instance: Chat or Price feeds, to the Mediator (M) and Mediator Router (MR) nodes. Once the specific application logic is running in the distributed mediation network, users may connect to the distributed mediation network via an LPP. Additional logical nodes can be added to the system without any disruption to the users of the distributed mediation network.

As remarked upon earlier, a physical node is an actual hardware processor and will contain an operating system. Consequently, a physical node may contain one or more logical nodes, for instance a Local Point of Presence (LPP), a Mediator (M), a Mediator Router (MR) or a Transmission Proxy (TP).

The management interface with which the human operator interfaces provides functions for performing these changes in logical topology in accordance with the predicates and constraints described above. The management interface may also provide viewing and notification functions for monitoring the operation of the distributed mediation network.

The invention claimed is:

1. A method for mediating the flow of messages in a computer network, wherein the computer network has a mediated distributed network that includes:
two local point of presence (LPP) modules;
two mediator (M) modules for hosting mediation tasks;
two mediator router (MR) modules for analyzing the content of incoming messages, each MR module routing the incoming messages to a predetermined M module in dependence upon said content; and
two transmission proxy (TP) modules each for forwarding messages received from a respective one of said two mediator (M) modules to at least one of said LPP modules,
wherein, each of said two LPP modules directly interfaces between one of the two MR modules of the mediated distributed network and client programs external to said mediated distributed network when inputting messages to said mediated distributed network, and between one of said two TP modules of said mediated distributed network and said client programs external to said mediated distributed network when outputting mediated message from said mediated distributed network
wherein each of the LPP, MR, M, and TP are separate and distinct entities and wherein, in the method, incoming messages to the mediated distributed network are propagated along a mediation cycle that comprises the steps of:
an LPP module, addressing incoming messages to a respective one of said two mediator router (MR) modules;
in said addressed MR module, analyzing the content of incoming messages and routing said messages to a predetermined mediator module in dependence upon said analyzed content;
in said predetermined mediator module, applying the mediation task to said analyzed messages to transform said analyzed messages to mediated messages and directing said mediated messages to a respective one of said TP modules; and
in said TP module that receives said mediated messages, forwarding said mediated messages to at least one of said LPP modules, wherein the incoming messages to the mediated distributed network belong to one of the group of message types including client messages, control messages, or management messages.

2. A method as claimed in claim 1, wherein the two mediator modules comprise a donor mediator module and a recipient mediator module,
the method further comprising: inducing a handover of a mediation task from the donor mediator module to the recipient mediator module by directing a control message as an incoming message along the mediation cycle.

3. A method as claimed in claim 2, wherein the control message is a mediator handover message, the content of the mediator handover message describing the reallocation of content having a predetermined content tag from the donor mediator module to the recipient mediator module, where the donor mediator module is currently registered as handling said content, and
wherein the direction of the mediator handover message comprises:
from a predetermined LPP module, sending the mediator handover message to a respective associated MR module;

at the associated MR module, reading said content tag and forwarding the message to the donor mediator module; and upon receipt of the mediator handover message, the donor mediator module: changing mediator node state; sending a MEDIATOR_HANDOVER message to the recipient mediator module, the MEDIATOR_HANDOVER message containing the content of the mediator handover message; sending a MEDIATOR_CHANGED message to an associated TP module; and then changing state in order to forward messages containing the content tag to the recipient mediator module.

4. A method as claimed in claim 3, further comprising:

the TP module forwarding the MEDIATOR_CHANGED message to at least one LPP module;

the recipient mediator module generating a NEW_MEDIATOR_ACTIVE message, the NEW_MEDIATOR_ACTIVE message having a payload corresponding to the reallocated content, and broadcasting said NEW_MEDIATOR_ACTIVE message to all TP modules associated therewith; and the LPP module buffering all incoming messages between receipt of the MEDIATOR_CHANGED message and receipt of the NEW_MEDIATOR_ACTIVE message.

5. A method as claimed in claim 4, further comprising:

the LPP module then forwarding the NEW_MEDIATOR_ACTIVE message to the associated MR module; and whenever a MR module receives a NEW_MEDIATOR_ACTIVE message, updating a routing table for said MR module to cause future content matching the payload of the NEW_MEDIATOR_ACTIVE message to be sent to the recipient mediator module rather than the donor mediator module; informing the donor mediator module that the routing table has been updated, the donor mediator module thereafter ceasing to forward messages once all MR modules have been informed that the recipient mediator module is now the mediator module for the reallocated content.

\* \* \* \* \*